June 14, 1938.  F. S. HODGMAN  2,120,950
AUTOMATIC STEERING FOR SHIPS
Original Filed April 13, 1935   2 Sheets-Sheet 1
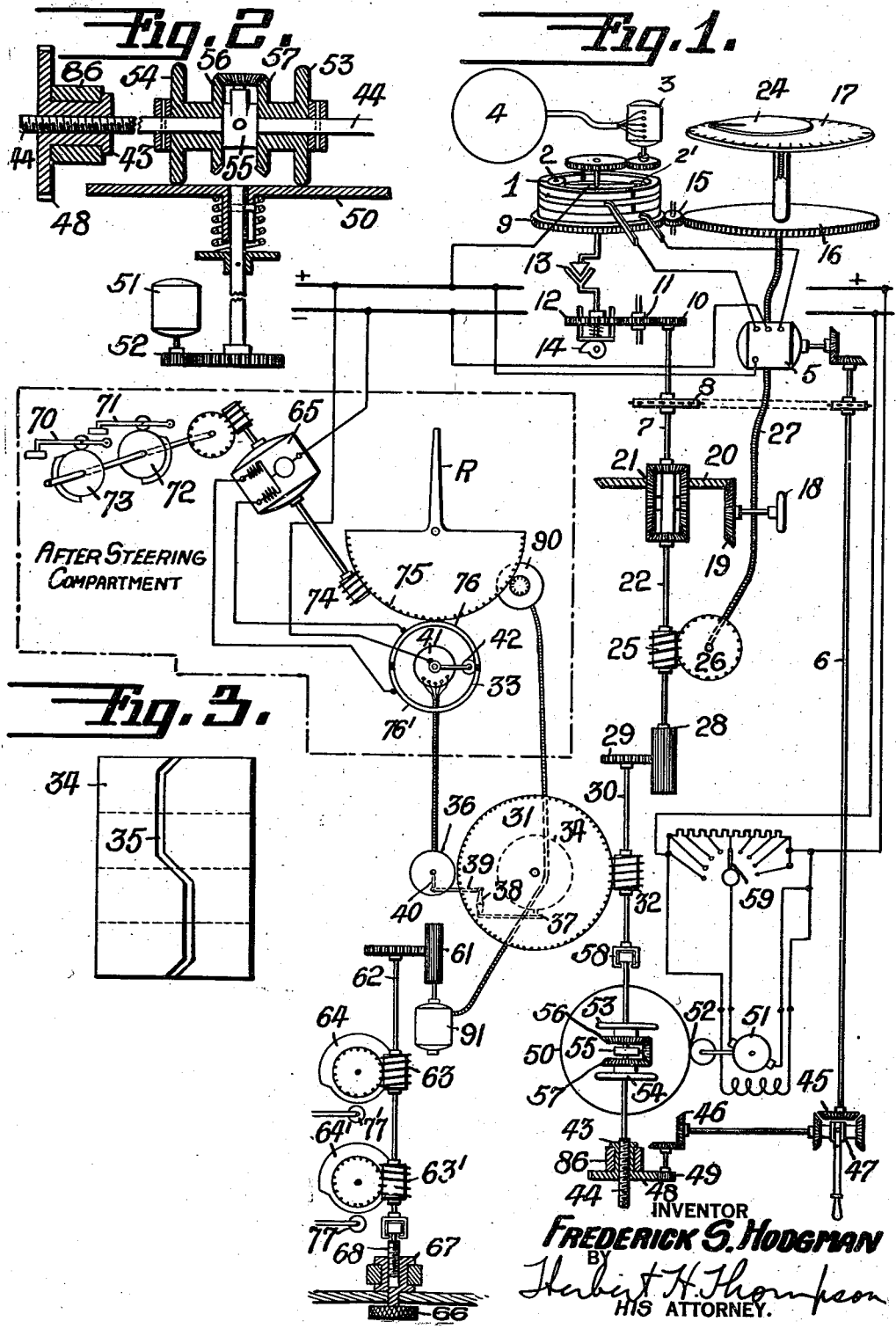

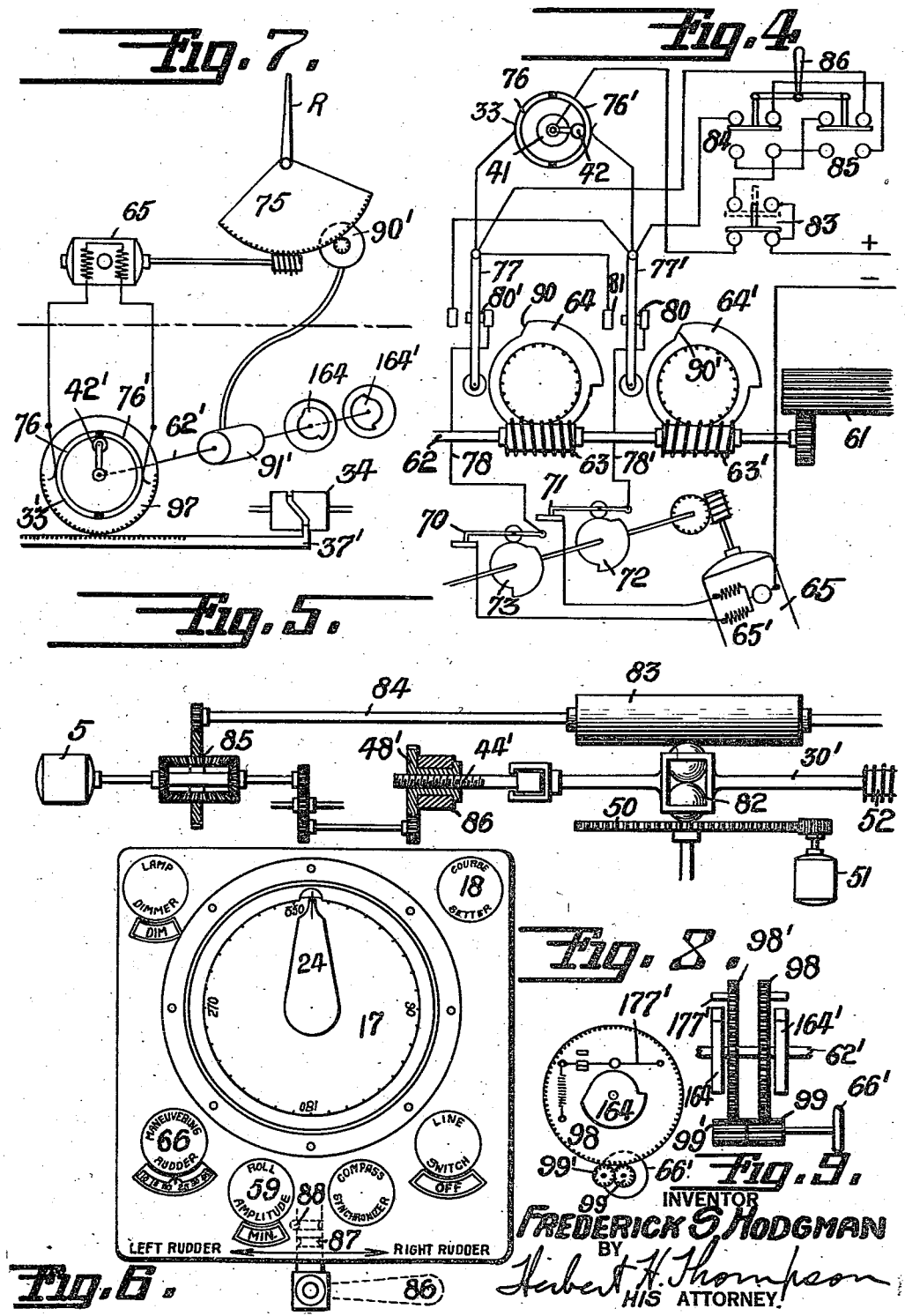

Patented June 14, 1938

2,120,950

UNITED STATES PATENT OFFICE 2,120,950

AUTOMATIC STEERING FOR SHIPS

Frederick S. Hodgman, Glen Rock, N. J., assignor to Sperry Gyroscope Company, Inc., Brooklyn, N. Y., a corporation of New York Application April 13, 1935, Serial No. 16,173
Renewed October 20, 1937

13 Claims. (Cl. 114—144)

This invention relates to automatic steering devices for ships or other dirigible craft. In order to maintain a high speed ship on its course, many factors enter in addition to the relative position of the compass and ship's heading at any particular instant, such as the necessity for preventing the ship, due to its momentum, from swinging beyond its prescribed course as it is brought back to the course. According to the present invention, I propose a rudder control from a gyro compass or other base line, which is responsive not only to the relative position of the ship and compass, but also to the relative or apparent velocity of turn of the ship and compass. In order to effect this purpose, I have devised a novel mechanism for moving a member a distance proportional to the apparent velocity of turning of the compass, and which is therefore indicative of the rate of turn of the ship. I am aware that on paper, at least, it has been proposed to employ a rate of turn indicating device in automatic steering devices, but all such prior devices have involved, insofar as I am aware, an auxiliary gyroscope of the turn indicator type for obtaining the rate. Such devices, however, add extra complications and are impractical on shipboard on account of the fact that rolling and pitching seriously affect the accuracy and performance of this type of gyroscope.

Referring to the drawings showing several forms my invention may assume,

Fig. 1 is a diagrammatic view and partial wiring diagram of my invention.

Fig. 2 is a detail of the rate differentiating device.

Fig. 3 is a development of the cam slot employed in the mechanism for actuating a course transmitter.

Fig. 4 is a wiring diagram of the limit switches and control motor for the rudder.

Fig. 5 is a detail showing a modified form of rate differentiating mechanism.

Fig. 6 is a top view of a ship's steering stand according to my invention.

Fig. 7 is a diagram of a modified limit switch device.

Figs. 8 and 9 are details thereof.

My invention is shown as applied to the type of sensitive automatic steering device shown in my prior Patent No. 1,965,378, dated July 3, 1934, in which a small auxiliary follow-up motor is used between the compass actuated controller and the main controller which operates the rudder motor. In the drawings the compass actuated controller 1 is shown as one or more concentric rings on which a trolley or trolleys 2, on a rotatable arm, bear. In this instance the trolley arm is shown as turned from a repeater motor 3 actuated from a master compass 4. The rings are substantially semicircular and the two halves insulated from each other. The rings are mounted for rotation about the axis of rotation of the trolley arm and are rotated from a follow-back connection from an auxiliary motor 5 which is actuated from the controller and which actuates the main controller 33 and a follow-back connection to auxiliary controller 1. As shown, the motor 5 turns a shaft 6 through suitable gearing, which shaft in turn is connected to a shaft 7 through sprocket and chain gearing 8. The shaft 7, in turn, is shown as actuating a gear 9, on which controller rings are mounted through pinion 10, idler 11, gear 12 and variable lost motion device 13, the position of which may be adjusted by a cam 14. The gear 9 may also actuate an idler 15 and large gear 16, which turns a compass card 17.

Course changes may be interposed by means of a course changing knob 18 which actuates, through bevel gears 19 and 20, one arm of a differential gear train 21. A shaft 22 is connected to the arm of the gear train opposite the shaft 7, and will therefore be actuated both from the follow-up from the motor 5 and the course changing knob 18, but the card 17, being unaffected by said knob, will show true compass headings. An additional ship's heading indicator 24 may be provided above the card 17 and actuated from the shaft 22 through any suitable gearing, such as worm 25, worm wheel 26 and flexible shaft 27.

The shaft 22 also turns, through an elongated pinion 28, a gear 29 on shaft 30, which turns at reduced speed a worm wheel 31 through a worm 32. The gearing is such that the worm wheel 31 makes one revolution for one complete turn of the ship and is therefore synchronous with the compass and is used as the means for actuating a main controller 33. To this end there is shown a cam 34 on the shaft of said gear, which is provided with a slot 35, which is shown developed in Fig. 3. This slot oscillates a self-synchronous transmitter 36 through an angle preferably somewhat less than 180° for one revolution of the gear 31 through suitable linkage, such as a link 37 having a pin at one end engaging said slot and connected at its opposite end to a pivoted lever 38 which reciprocates link 39 connected to an arm 40 on the shaft of the transmitter. Said transmitter actuates a self-synchronous repeater motor 41 at the after end of the ship, which turns the motor contacts 42 of the main controller 33.

For introducing the rate of turn factor, I employ a device also actuated from the compass which differentiates the turn of the ship with respect to time. As shown, the shaft 6 also actuates, through any suitable form of gearing, a nut 43 threaded on a shaft 44. Said gearing is shown as comprising a plurality of groups of bevel gears 45 and 46, the former having incorporated therein a reversing clutch 47 so that the nut may be rotated in either direction from the motor 5. The nut itself is mounted for rotation in a bearing 86 and has a gear 48 attached thereto, which is driven from a pinion 49 actuated, in turn, from the bevel gears 46. At 50 is shown a friction disk rotated at a constant speed from a motor 51 through gearing 52. Frictionally engaging said disk at their peripheries are two smaller friction disks 53 and 54, which are rotatably but nonslidably mounted on an extension of the threaded shaft 44. The shaft 44, in turn, is connected to a planetary arm 55 of a differential gear train, the other two arms of which are formed by bevel gears 56 and 57 connected, respectively, to said disks 53 and 54. Since the disks normally rest on the opposite sides of the center of rotation of the driving disk 50 (see Figs. 1 and 2), it will be apparent that the center arm will not rotate as long as said disks maintain this position. If, however, the nut 43 is rotated so as to advance or retract the screw shaft, the disks will be rotated at unequal speeds, thereby rotating the center arm until the threaded shaft is screwed back again in its nut to restore the position of equilibrium. The accuracy of the #1 follow-up is such that the motor will start and stop continuously from any movement of roller 2. The full speed of the servo-motor is selected to produce rotation of rings 1 slightly greater than the maximum rate at which roller 2 can turn in azimuth. For any given turning rate of the ship, therefore, the rings will have a similar follow-up rate, which rate is also made up of a large number of starts and stops. The time lag of the speed gear system is such as to show a displacement which is proportional to this average speed. Therefore the threaded shaft will be positioned longitudinally a distance proportional to and indicative of the rate of turn of the ship. This factor may be introduced differentially into the position of the gear 31. To this end the extension of shaft 44 is shown as connected through a thrust bearing 58 to the shaft 30 so as to push the same axially when the shaft 44 is moved axially, thereby rotating the gear 31 through the axial movement of the worm 32.

Under certain sea conditions it may be advisable to vary the amount of rudder movement applied for a given rate of turn of the ship, and in order to effect this in a simple manner, I have shown a means for varying the speed of the motor 51 through a potentiometer 59 connected in the armature circuit thereof. It will be clear that for any increase or decrease in the speed of spinning motor 51, there will be a lesser or a greater displacement of the speed gears and shaft 44, when compared to the normal rate of turn of the ship as represented by shaft 6. The method shown accomplishes such a change in a novel manner, without the use of mechanical parts or gear changes.

I also provide a means on the bridge for limiting the amount of rudder angle in order that the ship may be made to turn through large angles with less rudder than hard over, which acts to limit the rate of turn. To this end I have shown a transmitter 90 at the rudder which actuates a repeater motor 91 on the bridge to turn directly or indirectly an elongated pinion 61 which turns a shaft 62. Said shaft is shown as provided with a pair of oppositely threaded worms 63 and 63' which revolve cams 64 and 64' in opposite directions. Normally these cams are arranged so that one will open the circuit of the main steering motor 65 when the rudder limit is reached in one direction, while the other opens the circuit for the other extreme position of the rudder, but it will readily be apparent that by changing the relative position of the cams with respect to the rest of the system, the rudder angle may be altered. This may be conveniently accomplished by means of a maneuvering rudder knob 66 which turns a nut 67 threaded on a short shaft 68 so as to advance or retract such shaft, and with it move axially shaft 62, thereby displacing the cams 64 and 64' in the same direction. As will be apparent from Figs. 1 and 4, this has the effect of altering the rudder throw in both directions at the same time, since the two cams are normally revolved in opposite directions by the rotation of the shaft 62.

The limit switch, as shown, is novel in the sense that it cooperates with controller 33 to provide a two part remote control of a distant object, such as the rudder. It provides two-way remote control, whereby the rudder may be returned to lesser angles at will, as well as increased to greater angles.

The main controller at the after end actuates the main reversible motor 65 directly, but I prefer to also employ limit switches 70 and 71 at the rudder, which remain fixed, the cams for operating the same, 72 and 73, being actuated directly from the motor shaft.

The motor is shown as turning the rudder R directly through worm 74 and worm sector 75, but it will be understood that if desired, any suitable steering engine may be interposed. The follow-back connection from the rudder to the main controller is represented as effected from sector 75 on the rudder, which is shown as turning the follow-up rings 33 of the controller through a gear (not shown).

Referring now to the wiring diagram in Fig. 4, showing the main controller and motor circuits, the two rings 76 and 76' of the main controller are connected to contact arms 77 and 77', said arms having rollers thereon adapted to be engaged by the cams 64 and 64'. When disengaged, the circuit is completed through each of wires 78 and 78' through the main limit switches 70 and 71 and through the oppositely wound field coils 65' of the motor 65, so that the motor will be driven in one direction or the other, depending upon whether the trolley 42 is on segment 76 or 76'. Assuming the motor to be running in a direction to rotate the cam 64' to the left, it will be seen that the circuit will be broken at switch 80 by the opening of the switch arm 77' if said cam strikes the arm before the switch 71 is opened, the cam then resting on inclined surface 90'. If, however, the pilot then desires to turn the rudder back part way, he turns knob 66 further, which will cause the roller to ride on top of cam 64' and complete contact 81, which will excite the opposite motor field through switch arm 77 and contact 80'.

The group of switches 83, 84 and 85 are actuated from the auxiliary hard-over steering handle 86 (Fig. 6). When this handle is out, as shown in Fig. 6, the automatic steering gear is functioning and the switch 83 is closed to the position shown in Fig. 4. When, however, it is desired to steer by hand, the handle is pushed inwardly to bring notch 87 under the ball 88, thereby moving the switch 83 upwardly into the dotted line position (Fig. 4). In this position the movement of the handle 86 to the right or left operates the switches 84 and 85 to steer the ship through the same electric steering motor 65 as employed when steering the ship automatically.

A somewhat different form of rate indicating device is shown in Fig. 5. According to this form, the disk 50 is rotated, as before, at constant speed from a motor 51. In this case the two disks 53 and 54 are replaced by what is known as a two-ball integrator 82, which is radially adjustable on the surface of said disk, so that it will be evident that the balls will be revolved at a rate proportional to the radial movement thereof over the disk. The balls drive a cylinder 83 on shaft 84 which, in turn, drives a planetary arm 85 of a planetary gear train. One arm of said train is shown as actuated directly from the auxiliary motor 5, while the third arm actuates, through suitable gearing, a nut 48' of Fig. 1, the same being threaded on a shaft 44' and held against axial movement in bearing 86. The axial movements of the shaft 44' move the two-ball integrator radially on the disk 50 so that the movements of the shaft 30', corresponding to shaft 30, indicate the rate of turn of the ship.

A further slight modification is shown in Figs. 7, 8 and 9 in connection with the method of actuating the limit cams 64 and 64' on the bridge. According to this modification, the main controller 33' is placed at the control device in the pilot house instead of aft and a follow-back connection is provided between the rudder and the controller by means of transmitter 90' at the rudder and repeater motor 91' which not only drives the limit cams 164 and 164' through shaft 62', but also provides a follow-up connection to the controller by turning the trolley 42. The contact rings in this instance are shown as turned from the cam 34 by means of the rack bar 37, the teeth of which mesh with the gear 97 on which the contact segments are mounted. In this case the variation in the position of the limit cams is shown as effected by mounting the contact arms 177' on gears 98 and 98', respectively, which may be rotated with respect to the cams by means of the adjusting knob 66'. Said knob operates to turn said gears in opposite directions through pinions 99 and 99'.

The advantages of some of the hereinbefore described novel features of my invention lie in the adaptability of my invention to steering a high speed ship under greatly different conditions. When proceeding at high speed in calm weather, it is desirable that the ship be held on a straight course and that yawing be eliminated. Under these conditions the rheostat 59 should be adjusted to give a fairly large movement of the shaft 44 for changes of rate of turn so as to quickly apply a large rudder for rapid rates to check the yaw. When proceeding more slowly or in a rough sea, the motor 51 may be slowed down, or the rate device may be eliminated entirely by moving the clutch 47 to the mid position.

It is also a well known fact that when a ship is rolling and pitching, a violent yawing effect takes place, known as a weather yaw, which is of fairly large amplitude and of much greater rate than the ordinary ship's yawing. Therefore, under severe weather conditions I may find it desirable to reverse the effect of the rate differentiating device in order to diminish rather than to increase the rudder throw as the rate of yaw increases. This may be conveniently accomplished by throwing the clutch 47 in the reverse position.

The pilot house limit switches 64 and 64' are advantageous when a fleet is maneuvering in formation and it is desired that the ships make a turn at a predetermined rate. By setting the rudder limit switches, the rate of turn may be limited even though a large turn of, say, 180° is signalled and set on the controller by knob 18.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an automatic steering device for ships, a master compass, a controller actuated therefrom for actuating the ship's rudder, said actuating means including a device for differentiating the relative turning of the ship and compass with respect to time, and means for varying the time element of said device for the purpose specified.

2. In an automatic steering device for dirigible craft, such as ships, a rate of turn determining device, a craft's heading maintaining device, means whereby the craft's rudder may be controlled from the latter device alone, and means whereby said control devices may be combined either to lessen or increase the rudder throw at will for rapid yaws of the craft.

3. In an automatic steering device for a ship having a master compass, compass controlled means for detecting deviations from course, compass controlled means for also measuring the rate of deviation, both said means being controlled primarily from said master compass, and means for actuating the rudder by said first two means jointly.

4. In an automatic steering device for ships, compass controlled means for detecting deviations from course, a disk driven at a uniform speed, a rotatable member driven by said disk at a speed proportional to its radial distance from the center of said disk, a threaded shaft and rotary nut for adjusting radially said member, one of said shaft or nut being rotated by said member and the other by said compass means, and means for actuating the rudder from the radial position of said member and the course deviation detecting means.

5. In an automatic steering device for ships, compass controlled means for detecting deviations from course, compass controlled means for also measuring the rate of deviation, means for actuating the rudder by said first two means jointly, and means for varying or reversing the effect of said rate means under different weather conditions.

6. An automatic steering device as claimed in claim 4, in which means are provided for varying the speed of rotation of said disk at will, to vary the relative effect of the rate means under different sea conditions.

7. An automatic steering device as claimed in claim 4, in which means are provided for reversing the rotation of said disk to reduce rudder throw for weather yaw.

8. In an automatic steering device for ships, a master compass, a repeater motor actuated therefrom, a mechanical differentiating device for differentiating the turning of said motor with respect to time, and a controller actuating the ship's rudder, operated differentially from said device and repeater motor.

9. In an automatic steering device for ships, compass controlled means for detecting deviations from course, compass controlled means for also measuring the rate of deviation, means for actuating the rudder by said first two means jointly, and means for varying the effect of said rate means under different weather conditions.

10. In an automatic steering device for ships, compass controlled means for detecting deviations from course, compass controlled means for also measuring the rate of deviation, means for actuating the rudder by said first two means, and means for varying the manner in which said first two means are combined to either increase or decrease the normal rudder angle under different sea conditions.

11. In an automatic steering device for ships, the combination with a master compass, a disk normally driven at uniform speed, a rotatable member driven by said disk at a speed proportional to its radial distance from the center of said disk, a threaded shaft and rotary nut for adjusting radially said member, one of said shaft or nut being rotated by said member and the other by said compass means, and means for actuating the rudder from the radial position of said member.

12. An automatic steering device as claimed in claim 11, in which means are provided for varying the speed of rotation of said disk at will, to vary the relative effect of the rate means under different sea conditions.

13. In an automatic steering device for dirigible craft, such as ships, a direction maintaining means, a controller actuated therefrom for turning the craft's rudder, said actuating means including a device for differentiating the relative turning of the craft and direction means with respect to time, and means for varying the time element of said device to vary the proportional correction introduced by said device with varying weather conditions.

FREDERICK S. HODGMAN.